United States Patent
Matlija

(10) Patent No.: US 9,210,113 B2
(45) Date of Patent: Dec. 8, 2015

(54) METHOD, SYSTEM AND APPARATUS FOR AUTOMATICALLY UNSUPPRESSING THREADS

(71) Applicant: RESEARCH IN MOTION LIMITED, Waterloo (CA)

(72) Inventor: Alvis Matlija, Kitchener (CA)

(73) Assignee: BLACKBERRY LIMITED, Waterloo, Ontario (CA)

(\*) Notice: Subject to any disclaimer, the term of this patent is extended or adjusted under 35 U.S.C. 154(b) by 248 days.

(21) Appl. No.: 13/765,773

(22) Filed: Feb. 13, 2013

(65) Prior Publication Data
US 2014/0229553 A1    Aug. 14, 2014

(51) Int. Cl.
*G06F 15/16* (2006.01)
*H04L 12/58* (2006.01)

(52) U.S. Cl.
CPC ........................... *H04L 51/16* (2013.01)

(58) Field of Classification Search
CPC ......... G06F 1/00; H04L 12/58; H04L 12/586; H04L 51/04; H04L 51/32
USPC .......... 709/203, 206, 224, 226, 227, 229, 230
See application file for complete search history.

(56) References Cited

U.S. PATENT DOCUMENTS

| | | | | |
|---|---|---|---|---|
| 6,630,944 B1* | 10/2003 | Kakuta et al. | ................ | 715/758 |
| 7,593,995 B1* | 9/2009 | He et al. | ................ | 709/206 |
| 7,716,593 B2* | 5/2010 | Durazo et al. | ................ | 715/752 |
| 7,844,676 B2* | 11/2010 | Prahlad et al. | ................ | 709/206 |
| 8,046,014 B2* | 10/2011 | Donald et al. | ................ | 455/466 |
| 8,200,762 B2* | 6/2012 | Staats | ................ | 709/206 |
| 2008/0294730 A1 | 11/2008 | Oral et al. | | |
| 2008/0301250 A1* | 12/2008 | Hardy et al. | ................ | 709/207 |
| 2009/0319617 A1* | 12/2009 | Bhakar et al. | ................ | 709/206 |
| 2010/0262666 A1* | 10/2010 | Kalu | ................ | 709/206 |
| 2013/0124648 A1* | 5/2013 | Kallayil | ................ | 709/206 |

OTHER PUBLICATIONS

Intelligently Silence Gmail Conservations with "Smart Mute" http://thenextweb.com/google/2010/12/02/intelligently-silence-gmail-conversations-with-smart-mute/ (accessed Jan. 28, 2013).

\* cited by examiner

*Primary Examiner* — Umar Cheema
*Assistant Examiner* — Jean P Mendez Flores
(74) *Attorney, Agent, or Firm* — Perry + Currier, Inc.

(57) ABSTRACT

A method, system and apparatus for automatically unsuppressing threads are provided. A message associated with a suppressed thread is received, using a communication interface of device. The suppressed thread is automatically unsuppressed by a processor of the device when one or more of: the message is from a contact that is flagged in a contact list; and, the contact that is flagged in the contact list has been added as a recipient of the message as compared to at least a last message in the suppressed thread.

16 Claims, 14 Drawing Sheets

METHOD, SYSTEM AND APPARATUS FOR AUTOMATICALLY UNSUPPRESSING THREADS

FIELD

The specification relates generally to mobile devices, and specifically to a method, system and apparatus for automatically unsuppressing threads.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
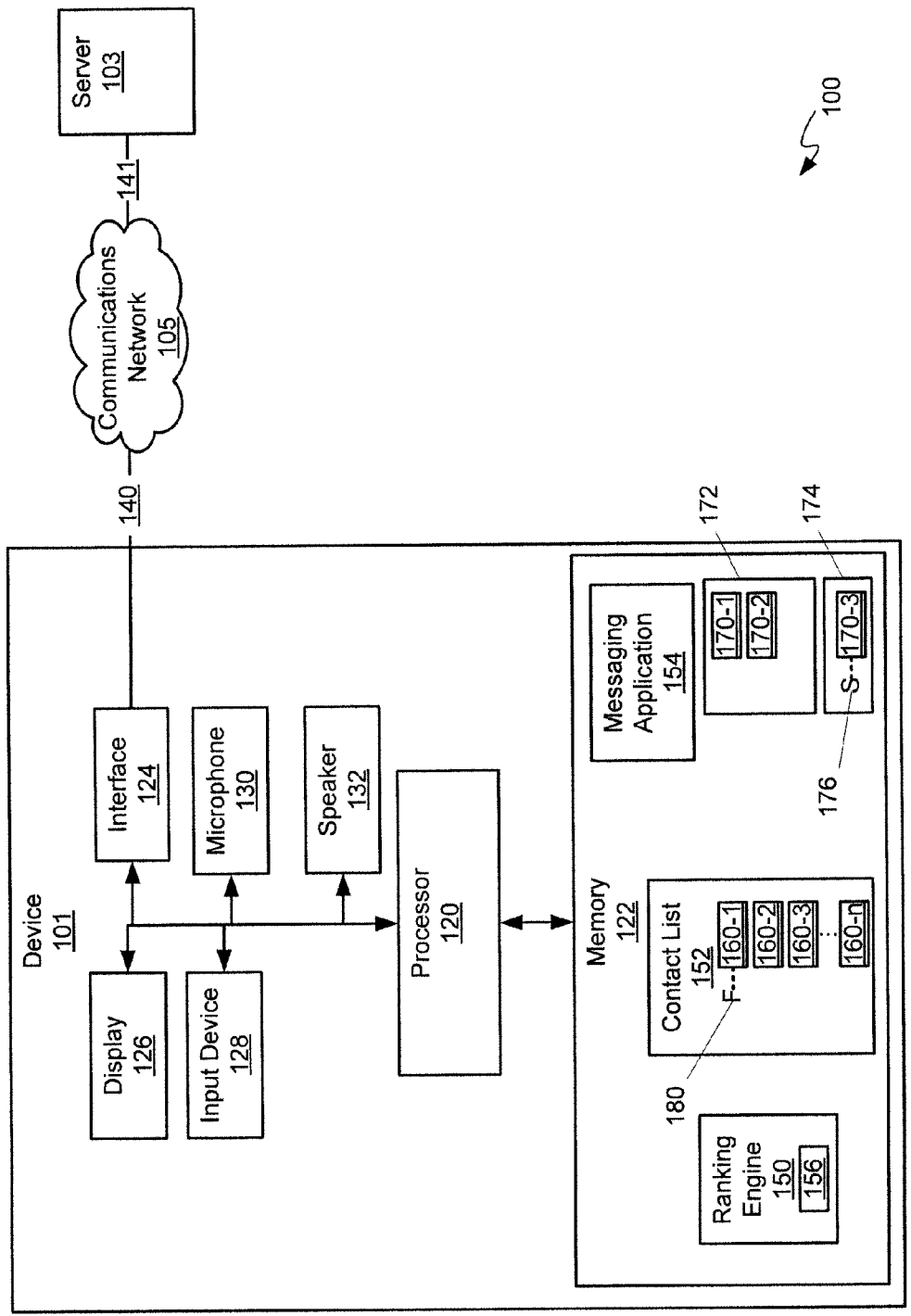
FIG. 1 depicts a system including a device for unsuppressing threads, according to non-limiting implementations.

In this specification, elements may be described as "configured to" perform one or more functions or "configured for" such functions. In general, an element that is configured to perform or configured for performing a function is configured to perform the function, or is enabled to perform the function, or is suitable for performing the function, or is adapted to perform the function, or is operable to perform the function, or is otherwise capable of performing the function.

An aspect of the specification provides a device comprising: a processor, a memory, and a communication interface, the processor configured to: receive, via the communication interface, a message associated with a suppressed thread; and, automatically unsuppress the suppressed thread when one or more of: the message is from a contact that is flagged in a contact list; and, the contact that is flagged in the contact list has been added as a recipient of the message as compared to at least a last message in the suppressed thread.

The processor can be further configured to process a ranking engine to flag contacts in the contact list when the contacts meet ranking criteria.

The ranking criteria can be based on one or more of an organizational chart, previous threads, and a time between receiving a message from a given contact and transmission of a responding message.

Unsuppressed threads can be stored in a first folder and the suppressed thread is stored in a second folder, and the processor can be further configured to automatically unsuppress the suppressed thread by automatically moving the suppressed thread to the first folder from the second folder. The first folder can stored at the memory and the second folder can be stored at the memory.

The device can further comprise a display, and the suppressed thread can be previously flagged as do-not-display such that the suppressed thread is not displayed at the display; and the processor can be further configured to automatically unsuppress the suppressed thread by automatically unflagging the suppressed thread such that at least the message is automatically displayed at the display. The message can be automatically visually flagged when displayed at the display.

The device can further comprise a display, and the suppressed thread can be previously flagged as do-not-display such that the suppressed thread is not displayed at the display; and the processor can be further configured to automatically unsuppress the suppressed thread by automatically unflagging the suppressed thread such that both the message and previous messages in the suppressed thread are automatically displayed at the display.

The device can further comprise an input device, and the processor can be further configured to, prior to receiving the message, suppress the suppressed thread in response to input data received at the input device.

The device can further comprise a ranking engine and a messaging application for managing one or more of threads and messages, and the ranking engine can ranks contacts in the contact list by flagging the contacts as important based on ranking criteria, and the messaging application can determine that the contact from whom the message is received is flagged by analyzing the contact list.

Another aspect of the specification provides a method comprising: receiving, using a communication interface of device, a message associated with a suppressed thread; and, automatically unsuppressing, at a processor of the device, the suppressed thread when one or more of: the message is from a contact that is flagged in a contact list; and, the contact that is flagged in the contact list has been added as a recipient of the message as compared to at least a last message in the suppressed thread.

The method can further comprise processing, at the processor, a ranking engine to flag contacts in the contact list when the contacts meet ranking criteria. The ranking criteria can be based on one or more of an organizational chart, previous threads, and a time between receiving a message from a given contact and transmission of a responding message.

Unsuppressed threads can be stored in a first folder and the suppressed thread can be stored in a second folder, and the method can further comprise automatically unsuppressing the suppressed thread by automatically moving the suppressed thread to the first folder from the second folder.

The suppressed thread can be previously flagged as do-not-display such that the suppressed thread is not displayed at a display of the device, and the method can further comprise automatically unsuppressing the suppressed thread by automatically unflagging the suppressed thread such that at least the message is automatically displayed at the display. The message can be automatically visually flagged when displayed at the display.

The suppressed thread can be previously flagged as do-not-display such that the suppressed thread is not displayed at a display of the device, and the method can further comprise unsuppressing the suppressed thread by automatically unflagging the suppressed thread such that both the message and previous messages in the suppressed thread are automatically displayed at the display.

The method can further comprise, prior to receiving the message, suppressing the suppressed thread in response to input data received at an input device of the device.

The method can further comprise: ranking, using a ranking engine, contacts in the contact list by flagging the contacts as important based on ranking criteria; and, determining, at a messaging application for managing one or more of threads and messages, that the contact from whom the message is received is flagged by analyzing the contact list.

A further aspect of the specification provides a computer program product, comprising a computer usable medium having a computer readable program code adapted to be executed to implement a method comprising: receiving, using a communication interface of device, a message associated with a suppressed thread; and, automatically unsuppressing, at a processor of the device, the suppressed thread when one or more of: the message is from a contact that is flagged in a contact list; and, the contact that is flagged in the contact list has been added as a recipient of the message as compared to at least a last message in the suppressed thread. The computer usable medium can comprise a non-transitory computer usable medium.

FIG. 1 depicts a system 100 comprising a device 101 for unsupressing threads, according to non-limiting implementations. System 100 generally comprises device 101 in communication with a server 103 via at least one communications network 105. The at least one communications network 105 will be interchangeably referred to hereafter as network 105. Device 101 comprises a processor 120 interconnected with a memory 122, a communications interface 124, a display 126, and an input device 128, and optionally a microphone 130 and speaker 132. Communication interface 124 will be interchangeably referred to hereafter as interface 124. It is further appreciated that device 101 and server 103 communicate via interface 124, a link 140 between device 101 and network 105, and a link 141 between server 103 and network 105. Server 103 generally comprises one or more of a mail server, a message server and an account server for handling mail and/or messages and/or accounts associated with device 101. It is further appreciated that while only one server 103 is depicted in FIG. 1, device 101 can be in communication with more than one server 103, for example, each server 103 comprising one or more of a mail server, a message server and an account server for accounts associated with device 101.

Device 101 further comprises a ranking engine 150, a contact list 152, and a messaging application 154 stored at memory 122, each of which can be processed by processor 120. Contact list 152 generally comprises contacts 160-1, 160-2, 160-3 . . . 160-$n$, which will interchangeably be referred to hereafter, collectively, as contacts 160, and generically as a contact 160. Further, while only four contacts 160 are depicted, contact list 152 can comprises fewer than four contacts 160 or greater than four contacts 160; indeed, a number of contacts 160 is generally appreciated to be non-limiting.

It is yet further appreciated that each contact 160 comprises one or more of contact data, electronic address data, and the like, including, but not limited to, an account identifier, an electronic address, an email address, a text message address, a device identifier and the like, which can be used to send messages to another device associated with a respective contact 160, as described below with reference to FIG. 5. Ranking engine 150 generally comprises an application for ranking contacts 160. In other words, processor 120, when processing ranking engine 150, generally flags contacts 160 in contact list 152 when given contacts 160 meet ranking criteria 156 associated with ranking engine 150. Ranking criteria 156 generally comprises criteria and/or rules for ranking contacts 160 and/or flagging contacts 160, as described below.

Messaging application 154 generally comprises an application for managing one or more of threads and messages; further memory 122 stores threads 170-1, 170-2, 170-3 of messages. Threads 170-1, 170-2, 170-3 will be interchangeably referred to hereafter, collectively, as threads 170 and, generically, as a thread 170. While only three threads 170 are depicted, it is appreciated that present implementations can comprise any number of threads 170. In any event, processor 120, when processing messaging application 154, generally manages messages received (for example, via interface 124 from server 103), organizes the messages into threads 170, and stores messages and/or threads 170 (for example, in one or more of an inbox folder, a deleted messages folder, archive folders, and the like). The storing can be based on one or more of: input data received via input device 128; and/or respective header data, respective message data, respective data, and the like, received with each message.

It is yet further appreciated that processor 120, when processing messaging application 154, is generally configured to organize messages into threads 170 by grouping together related messages based on common metadata, common header data, common subject data, and the like, between threads. Hence, each thread 170 comprises a group of associated messages.

Figure 2:
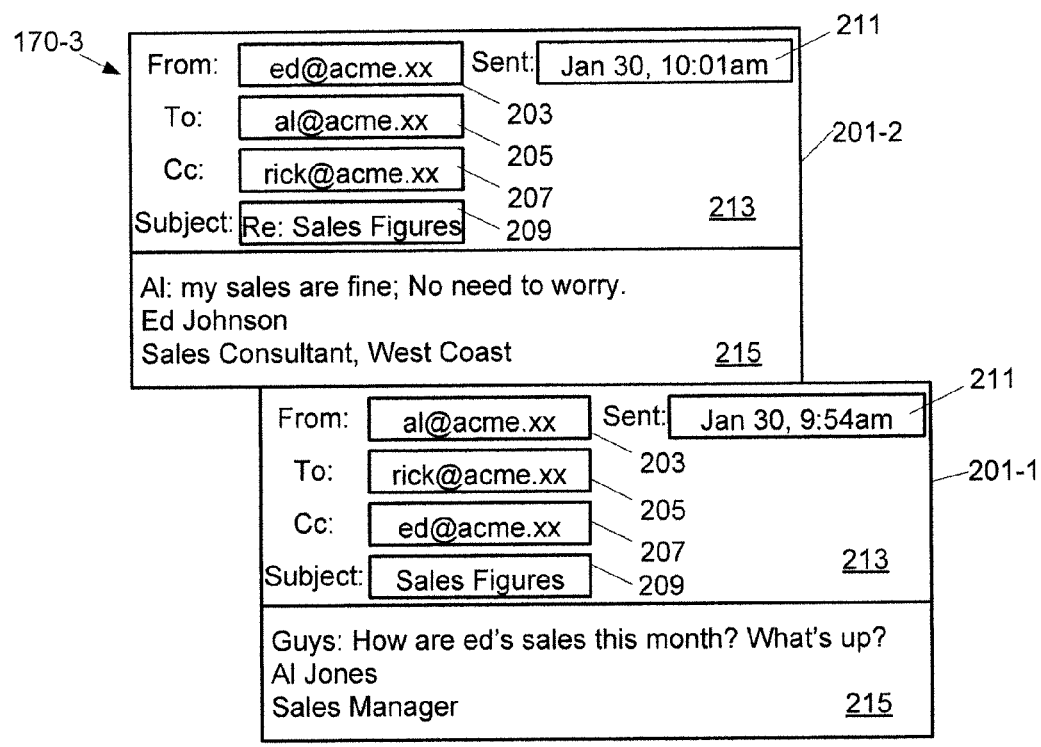
FIG. 2 depicts a thread of messages, according to non-limiting implementations.

For example, attention is directed to FIG. 2 which depicts a Graphic User Interface (GUI) of an example thread 170-3 comprising a first message 201-1 and a second message 201-2, interchangeably referred to hereafter, collectively, as messages 201 and generically as a message 201. Each message 201 comprises: a respective "From" field 203, indicating an electronic address (and/or identifier) from which a message 201 was received; a respective "To" field 205, indicating an electronic address (and/or proxy) to which a message 201 was transmitted; a respective "Cc" field 207, indicating an electronic address (and/or proxy) to which a message 201 was "cc'd" (i.e. "carbon-copied"); a respective subject field 209 indicating a subject of each message 201 (and indeed a subject of the thread 170-3); and a respective "Sent" and/or received field 211 indicating a time that the respective message was sent and/or received. In other words, field 203 comprises an electronic address of sender of message 201, and fields 203, 207, together, comprise a recipient list for message 201. It is appreciated that each of fields 201, 203, 205, 207, 209 and 211 are provided in a header area 213, and data contained therein can comprise metadata associated with each message 201. Each message 201 further comprises a text field 215 comprising the text and/or body of a message 201.

In the non-limiting example of FIG. 2, it is appreciated that message 201-2 was received after message 201-1, and that each message 201 is part of the same thread 170-3, as further indicated by the similar subjects in fields 209. It is also appreciated that message 201-2 was received from the same electronic address that is in "Cc" field 207 (i.e. "ed@acme.xx") of message 201-1. In other words, while message 201-1 was originally addressed to "rick@acme.xx" (i.e. the electronic address in "To" field 205 of message 201-1), the sender of message 201-1 (i.e. "al@acme.xx" in "From" field 203 of message 201-1) and a user who was cc'd on message 201-1 (i.e. "ed@acme.xx" in "Cc" field 207 of message 201-1), are having a conversation, and the original "To" recipient of message 201-1 is being cc'd in response message 201-2. Further, as a consequence, the original "To" recipient of message 201-1 may not be interested in the conversation between "ed@acme.xx" and "al@acme.xx", the conversation represented by the text in text fields 215.

It is further appreciated that, in the present non-limiting example, device 101 is associated with electronic address "rick@acme.xx".

Figure 3:
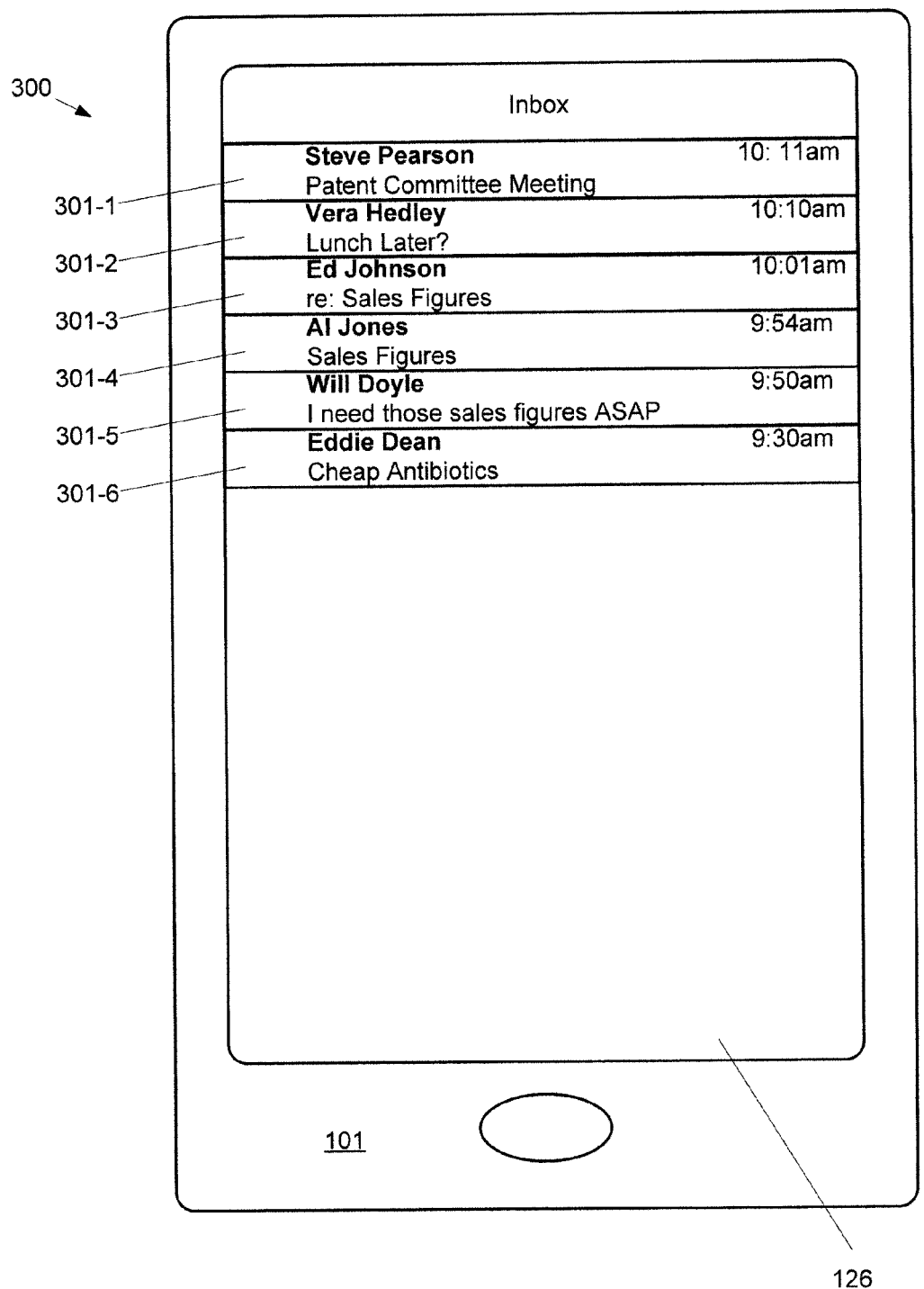
FIG. 3 depicts a graphic user interface of an inbox of the device of FIG. 1, including the thread of FIG. 2, before the thread of FIG. 2 is suppressed, according to non-limiting implementations.

It is further appreciated that other threads 170 can have structures and/or fields similar to thread 170-3 of FIG. 3. However, a structure of each thread 170 is generally non-limiting. Further, a GUI of each thread 170 is generally non-limiting.

It is yet further appreciated that while messages 201 are depicted as e-mail, present implementations are not so limiting. Rather, any electronic messages are within the scope of present implementations, including, but not limited to, email messages, text messages, SMS (short message service) messages, MMS (multimedia messaging service) messages, and the like.

Returning to FIG. 1, it is yet further appreciated that some threads 170 can be suppressed by one or more of: moving a thread 170 from a first folder 172 to a second folder 174; and, flagging a thread 170 as suppressed.

In depicted implementations, each of first folder 172 and second folder 174 can be stored at memory 122. In some implementations, first folder 172 can comprise an inbox folder and second folder 174 can comprise one or more of a deleted messages folder, a suppressed threads folder, an archive folder and the like. For example threads 170-1, 170-2 can be stored in first folder 172 and thread 170-3 can be stored in second folder 174; hence, thread 170-3 is appreciated to be suppressed while threads 170-1, 170-2 are not suppressed. In other words, in FIG. 1, it is assumed that thread 170-3 has been previously suppressed.

Alternatively, a thread 170 can be marked as suppressed via a flag 176, also referred to hereafter as flag "S". For example, in depicted implementations, thread 170-3 has been flagged with flag 176, while other threads 170 are not flagged. While flag 176 is depicted as being stored separately, but in association with, thread 170-3 (as represented by the dashed line between flag 176 and thread 170-3), flag 176 can also be stored in a field of thread 170-3. Indeed, it is appreciated that each thread 170 can include a field for storing a respective flag 176. Hence, in these implementations, thread 170-3 could alternatively be stored in first folder 172, but flagged with flag 170. In other words, only one of storage of thread 170-3 at folder 174 and flagging thread 170-3 with flag 176 is sufficient to indicate that thread 170-3 is suppressed. Indeed, any indication of marking and/or flagging and/or designating thread 170-3 as suppressed is within the scope of present implementations.

In general, a suppressed thread 170 is appreciated to be a thread which is not displayed in an inbox of messaging application 154, when a Graphic User Interface (GUI) of messaging application 154 is displayed at display 126. Hence, attention is next directed to FIG. 3 which depicts a non-limiting example of a GUI of an inbox 300 provided at display 126 of device 101 before thread 170-3 is suppressed (i.e. inbox 300 does not yet represent the state of device 101 as depicted in FIG. 1). Inbox 300 comprises a plurality of fields 301-1, 301-2, 303-3, 301-4, 301-5, 301-6 (referred to interchangeably hereafter, collectively as fields 301, and generically as a field 301) each corresponding to a message at inbox 300. While six messages are depicted at inbox 300, one in each field 301, the number of messages at inbox 300 is generally appreciated to be non-limiting. It is further appreciated that field 301-4 corresponds to message 201-1 of FIG. 2, and field 301-3 corresponds to message 201-2 of FIG. 2, and hence fields 301-3, 301-4 correspond to thread 170-3, which has not yet been suppressed. Alternatively, fields 301-3 and 301-4 can be grouped together, and/or only field 301-3 corresponding to a latest message 201-2 in a thread 170-3 can be displayed, with the earlier message 201-1 accessible by opening message 201-2 corresponding to field 301-3.

In addition, each field 301 can comprise an indication of a sender of the respective message (e.g. "Steve Pearson, "Vera Hedley", "Ed Johnson", "Al Jones", Will Doyle" and "Eddie Dean"), a time that a respective message is received, and a subject of the respective message (e.g. on the second line of each field 301). At least the sender and the subject can be received with a respective message in a respective header and/or metadata of the message, for example, headers 213 of messages 201 in FIG. 2.

It is further appreciated that content of each field 301 is generally non-limiting and can include any suitable indication of a respective message.

In any event, in FIG. 3, thread 170-3 comprising messages 201 (i.e. corresponding to fields 301-3, 301-4) has not yet been suppressed. However, attention is next directed to FIG. 4, which is substantially similar to FIG. 3 with like elements having like numbers, where thread 170-3 comprising messages 201 (i.e. corresponding to fields 301-3, 301-4) has been suppressed, for example due to a user interaction with device 101 to suppress and/or delete and/or archive thread 170-3 and/or flag thread 170-3 as suppressed, as described above. In any event, in FIG. 4, fields 301-3, 301-4 are no longer displayed at inbox 300, as thread 170-3 corresponding thereto has been suppressed, as in FIG. 1.

In some implementations, notifications associated with suppressed threads 170 are not provided at device 101; in other words, when a new message is received in a suppressed thread 170-3, the message is stored in the suppressed thread 170-3 and no notification of the message is generally provided. Hence, in implementations where a suppressed thread 170-3 is stored in first folder 172 and/or an inbox folder, with other threads 170 that are not suppressed, a suppressed thread 170-3 is not displayed at display 126 and notifications for suppressed thread 170-3 are not provided.

Returning now to ranking criteria 156 of FIG. 1, ranking criteria 156 can be based on one or more of: an organizational chart, for example accessible at server 103, and the like; previously stored threads 170; previously stored messages; a time between receiving a message from a given contact and transmission of a responding message to the given contact; and the like. For example, ranking criteria 156 can comprise rules that, when processed, cause contacts 160 to be flagged and/or ranked. Such rules can include, but are not limited to: "contacts 160 associated with users who are located above a user of device 160 in an organizational chart are to be flagged as important"; "contacts 160 associated with users who are located immediately above a user of device 101 in an organizational chart are to be flagged as important"; "contacts 160 associated with users who are located immediately above a user of device 101 in an organizational chart are to be flagged as important" (i.e. a manager and/or a supervisor of the user associated with device 101); "contacts 160 associated with threads 170 and/or messages that were responded to within 5 minutes are to be flagged as important" (though any given time period is within the scope of present implementations), and the like. However, such rules are provided as examples only, and it is appreciated that any ranking criteria 156 is within the scope of present implementations.

Further, ranking criteria 160 can be provisioned in any suitable manner. For example, ranking criteria 160 can be provisioned by an administrator of system 100, by a user of device 101 (via input device 128), and/or ranking criteria 160 can comprise ranking criteria installed at device 101 when ranking engine 150 is installed at device 101.

Further, as described herein, ranking engine 150 (or rather processor 120 when processing ranking engine 150) is configured to rank contacts based on a binary ranking system, and/or two ranking levels: flagged (e.g. important) and not flagged (e.g. not-important). Indeed, according to present implementations, a flagged contact 160 is appreciated to be "important", for example important to a user of device 101, based on ranking criteria 160. For example, in depicted implementations, contact 160-1 has been flagged with a flag 180, also referred to as a flag "F", while other contacts 160 are not flagged. While flag 180 is depicted as being stored separately, but in association with, contact 160-1 (as represented by the dashed line between flag 180 and contact 160-1), flag 180 can also be stored in a field of contact 160-1. Indeed, it is appreciated that each contact 160 can include a field for storing a respective flag 180.

Figure 5:
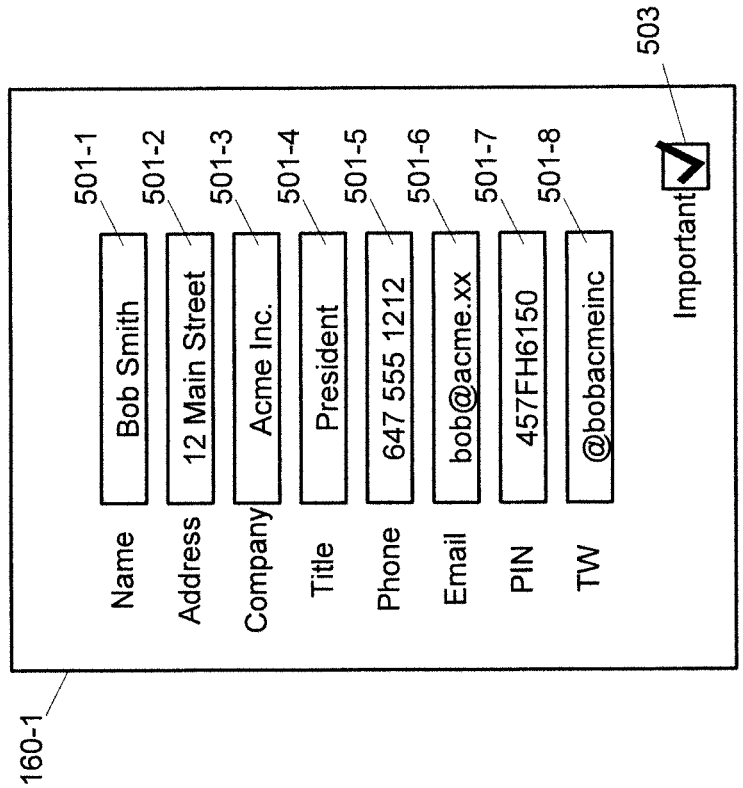
FIG. 5 depicts a graphic user interface of a flagged contact at the device of FIG. 1, according to non-limiting implementations.

For example, attention is directed to FIG. 5 which depicts a non-limiting example of a GUI of a flagged contact 160-1; in this non-limiting example, contact 160-1 comprises: a field 501-1 for a name identifier; a field 501-2 for an address identifier; a field 501-3 for a company identifier; a field 501-4 for a title identifier; a field 501-1 for a telephone number identifier, a field 501-6 for an email identifier; a field 501-7 for a device identifier (and/or personal identification number (PIN)); and a field 501-8 for a social media identifier. Fields 501-1, 501-2, 501-3, 501-4, 501-5, 501-6, 501-7, 501-8 will be interchangeably referred to herein, collectively, as fields 501, and generically as a field 501. Further, while eight fields 501 are depicted in FIG. 5, it is appreciated that a number of fields 501 is generally non-limiting and any suitable information can be stored in each contact 160. It is further appreciated that each identifier corresponding to fields 501-5 to 501-8 comprises an electronic address which can be used to send a receive messages to devices associated with a user corresponding to a respective contact (e.g. "Bob Smith", in the example of FIG. 5); further any number of electronic addresses can be stored in each contact 160.

In any event, contact 160-1 further comprises a field 503 corresponding to flag 180 described above. It is appreciated that when a marker (e.g. a checkmark) appears in field 503, contact 160-1 is flagged as "Important"; and, when no marker (i.e. a checkmark) appears in field 503, contact 160-1 is one or more of unflagged and not flagged as "Important".

It is further appreciated that other contacts 160 can have structures and/or fields similar to contact 160-1 of FIG. 5. However, a structure of each contact 160 is generally non-limiting.

It is further appreciated that any suitable indication for ranking and/or flagging a contact 160 is within the scope of present implementations.

Alternatively, in other implementations, ranking engine 150 can be configured to rank contacts 160 based on more than two ranking levels; in other words, each contact 160 can be ranked by ranking engine 150 based on a given ranking scale, for example, a scale of 1 to 10, based on ranking criteria 156. In these implementations, ranking criteria comprise rules for ranking a contact 160 on the corresponding scale. Further, in these implementations, each field 503 of each contact 160 can comprise an indicator of the raking level (e.g. one of a number from 1 to 10).

In addition, in some implementations, contacts 160 can be manually flagged and/or manually ranked via receipt of flagging input data at input device 128. For example, field 503 can be manually checked and/or unchecked via receipt of input data at input device 128, and/or a ranking level can be manually input into a field 503.

In any event, processor 120 is generally configured to: receive, via communication interface 124, a message associated with a suppressed thread 170-3; automatically unsuppress suppressed thread 170-3 when one or more of: the message is from a contact 160-1 that is flagged in contact list 152; and, the contact 160-1 that is flagged in contact list 152 has been added as a recipient of the message as compared to at least a last message in the suppressed thread 170-3. Alternatively, processor 120 is generally configured to: receive, via communication interface 124, a message associated with a suppressed thread 170-3; automatically unsuppress suppressed thread 170-3 when one or more of: the message is from an electronic address associated with a contact 160-1 that is flagged in contact list 152; and, the electronic address associated with the contact 160-1 that is flagged in contact list 152 has been added as a recipient of the message as compared to at least a last message in the suppressed thread 170-3.

Device 101 can be any type of electronic device that can be used in a self-contained manner to process ranking engine 150, contact list 152 and messaging application 154. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-configured appliances and the like. Other suitable devices are within the scope of present implementations.

In any event, server 103 is generally configured to push and/or transmit messages associated with device 101, to device 101. For example, while not depicted, server 103 receives messages on behalf of device 101 from remote communication devices (not depicted), for example via network 105, and transmits the messages to device 101.

Server 103 can otherwise be based on any well-known server environment including a module that houses one or more central processing units, volatile memory (e.g. random access memory), persistent memory (e.g. hard disk devices) and network interfaces to allow server 103 to communicate over link 141. For example, server 103 comprise a Sun Fire 8800 series server running a UNIX operating system, from Oracle Corporation, Inc. of Santa Clara Calif., and having eight central processing units each operating at about three thousand megahertz and having more than sixteen gigabytes of random access memory. However, it is to be emphasized that this particular server is merely a non-limiting example, and a vast array of other types of computing environments for servers 103 are contemplated. It is further more appreciated that server 103 can comprise any more than one server that can perform different functionality of server implementations described herein.

Link 140 comprises any suitable link for enabling device 101 to communicate with network 105. Similarly, link 141 comprises any suitable link for enabling respective server 103 to communicate with network 105. Links 140, 141 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of device 101 according to non-limiting implementations. It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony, in other implementations, device 101 can comprise a device configured for implementing any suitable specialized functions, including but not limited to one or more of telephony, computing, appliance, and/or entertainment related functions.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. In specific non-limiting implementations described herein, input device 128 comprises a touch screen for receiving touch input data.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores messaging application 154 that, when processed by processor 120, enables processor 120 to: receive, via communication interface 124, a message associated with a suppressed thread 170-3; automatically unsuppress suppressed thread 170-3 when one or more of: the message is from a contact 160-1 that is flagged in contact list 152; and, the contact 160-1 that is flagged in contact list 152 has been added as a recipient of the message as compared to at least a last message in the suppressed thread 170-3. Alternatively, when processor 120 processes messaging application 154, processor 120 is generally configured to: receive, via communication interface 124, a message associated with a suppressed thread 170-3; automatically unsuppress suppressed thread 170-3 when one or more of: the message is from an electronic address associated with a contact 160-1 that is flagged in contact list 152; and, the electronic address associated with the contact 160-1 that is flagged in contact list 152 has been added as a recipient of the message as compared to at least a last message in the suppressed thread 170-3.

It is yet further appreciated that messaging application 154, as well as ranking engine 150, are examples of programming instructions stored at memory 122.

Processor 120 in turn can also be configured to communicate with a display 126, and optionally a microphone 130 and a speaker 132. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, it is appreciated that display 126 and input device 128 are combined into one apparatus. Microphone 130, when present, comprises any suitable microphone for receiving sound and converting the sound to sound data. Speaker 132, when present, comprises any suitable speaker for providing sound data, audible alerts, audible communications from remote communication devices, and the like, at device 101.

In some implementations, input device 128 and display 126 are external to device 101, with processor 120 in communication with each of input device 128 and display 126 via a suitable connection and/or link.

Processor 120 also connects to interface 124, which can be implemented as one or more radios and/or connectors and/or network adaptors, configured to communicate with network 105 via link 140. In general, it will be appreciated that interface 124 is configured to correspond with the network architecture that is used to implement link 140, as described above. In other implementations a plurality of links with different protocols can be employed and thus interface 124 can comprise a plurality of interfaces to support each link.

While not depicted, it is further appreciated that device 101 comprises a power source, including but not limited to a battery and/or a power pack, or any other suitable (typically electric) power source.

In any event, it is appreciated that any suitable combination of interfaces is within the scope of present implementations.

Further, it should be understood that in general a wide variety of configurations for device 101 are contemplated.

Figure 6:
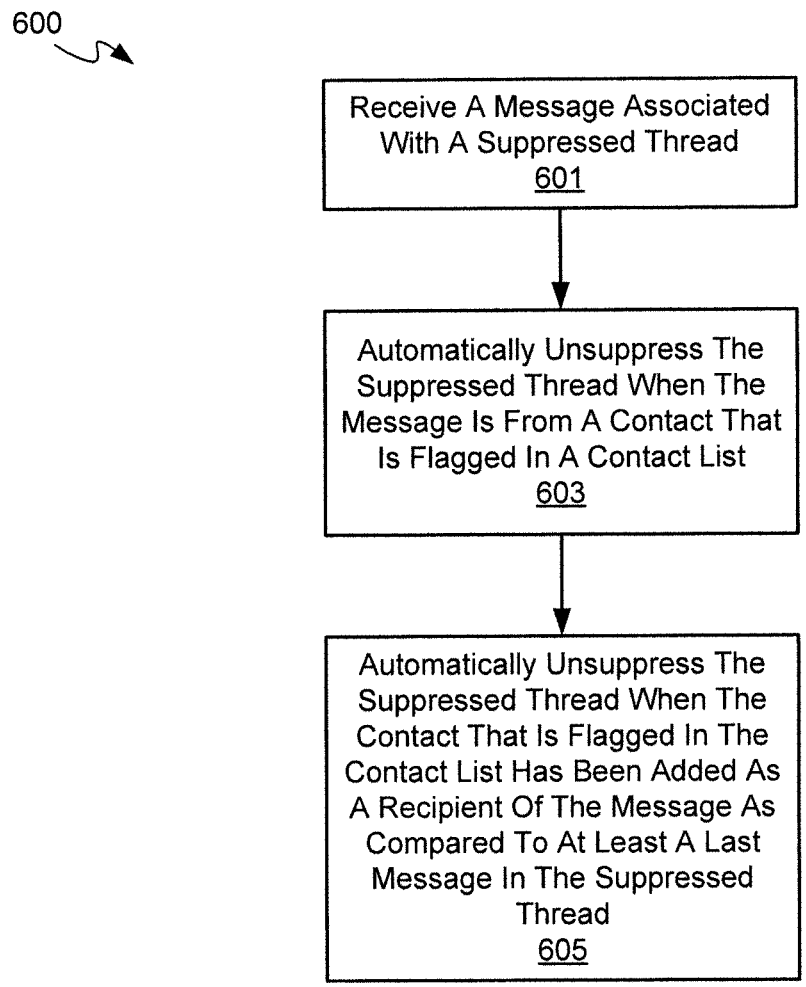
FIG. 6 depicts a flowchart of a method for unsuppressing threads, according to non-limiting implementations.

Attention is now directed to FIG. 6 which depicts a flowchart of a method 600 for automatically unsuppressing threads, according to non-limiting implementations. In order to assist in the explanation of method 600, it will be assumed that method 600 is performed using system 100. Furthermore, the following discussion of method 600 will lead to a further understanding of system 100 and its various components. However, it is to be understood that system 100 and/or method 600 can be varied, and need not work exactly as discussed herein in conjunction with each other, and that such variations are within the scope of present implementations.

It is appreciated that, in some implementations, method 600 is implemented in system 100 by processor 160 of device 101. Indeed, method 600 is one way in which device 101 can be configured. It is to be emphasized, however, that method 600 need not be performed in the exact sequence as shown, unless otherwise indicated; and likewise various blocks may be performed in parallel rather than in sequence; hence the elements of method 600 are referred to herein as "blocks" rather than "steps". It is also to be understood, however, that method 600 can be implemented on variations of system 100 as well.

At block 601, processor 120 receives, via interface 124, a message associated with a suppressed thread 170-3. At block 603, processor 120 automatically unsuppresses suppressed thread 170-3 when the message is from a contact 160-1 that is flagged in contact list 152. At block 605, processor 120 automatically unsuppresses suppressed thread 170-3 when contact 170-1 that is flagged in contact list 152 has been added as a recipient of the message as compared to at least a last message 201-2 in suppressed thread 170-3.

It is further appreciated that block 603 and 605 can be performed in any order and/or in parallel, such that processor 120 unsuppresses suppressed thread 170-3 when one or more of: the message is from a contact 160-1 that is flagged in contact list 152; and, contact 170-1 that is flagged in contact list 152 has been added as a recipient of the message as compared to at least a last message 201-2 in suppressed thread 170-3.

Figure 4:
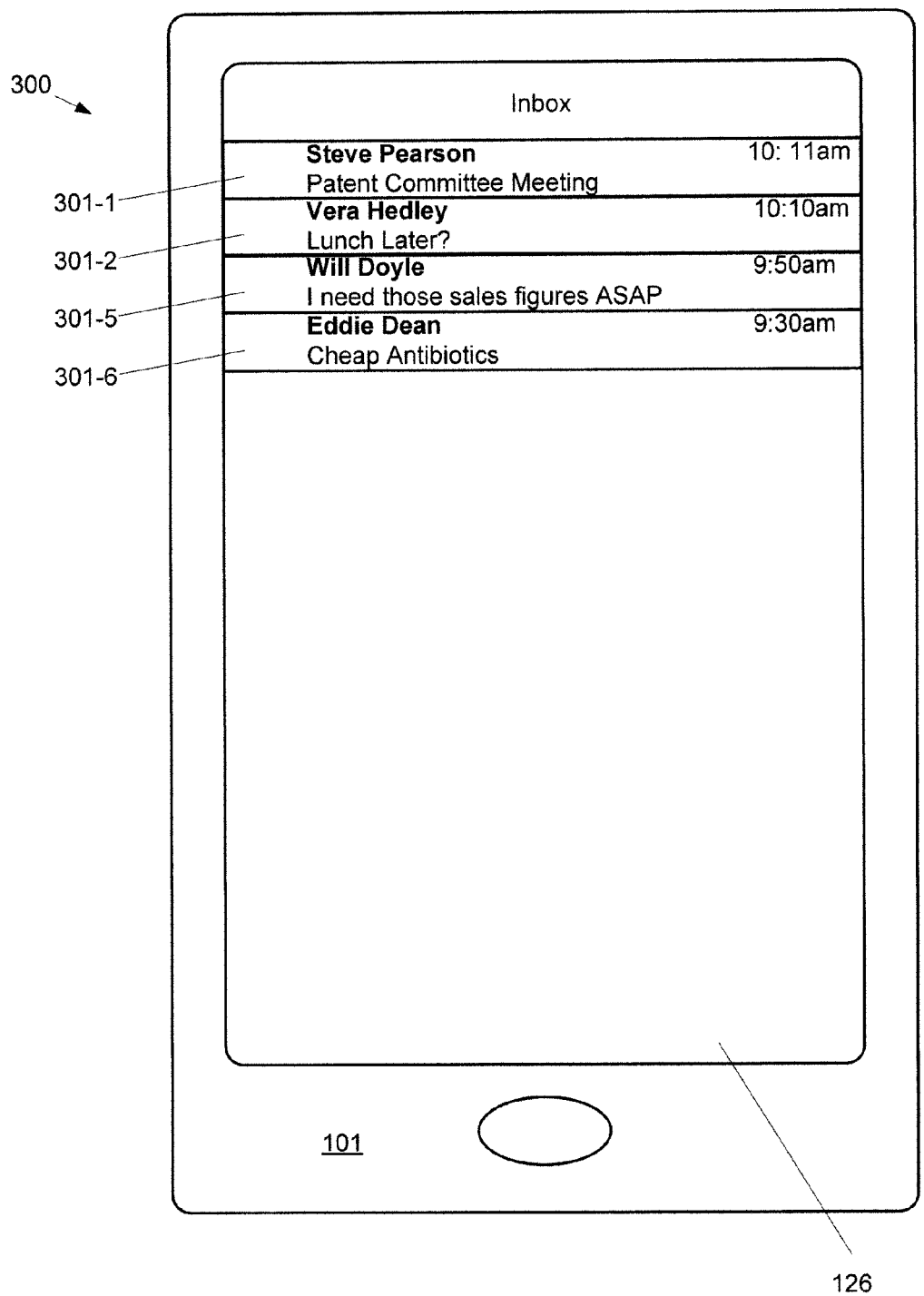
FIG. 4 depicts the inbox of FIG. 3 after the thread of FIG. 2 is suppressed, according to non-limiting implementations.

Non-limiting examples of method 600 will now be described with reference to FIGS. 7 to 14, with FIGS. 7, 9, 11 and 13 each being substantially similar to FIG. 1, with like elements having like numbers. In addition, FIGS. 8 and 12 are each substantially similar to FIG. 2, with like elements having like numbers. Similarly, FIGS. 10 and 14 are each substantially similar to FIG. 3, with like elements having like numbers. It is further assumed unless otherwise indicated, in the following discussion, that thread 170-3 has been suppressed, and hence inbox 300 (when displayed), is similar to as depicted in FIG. 4.

Figure 7:
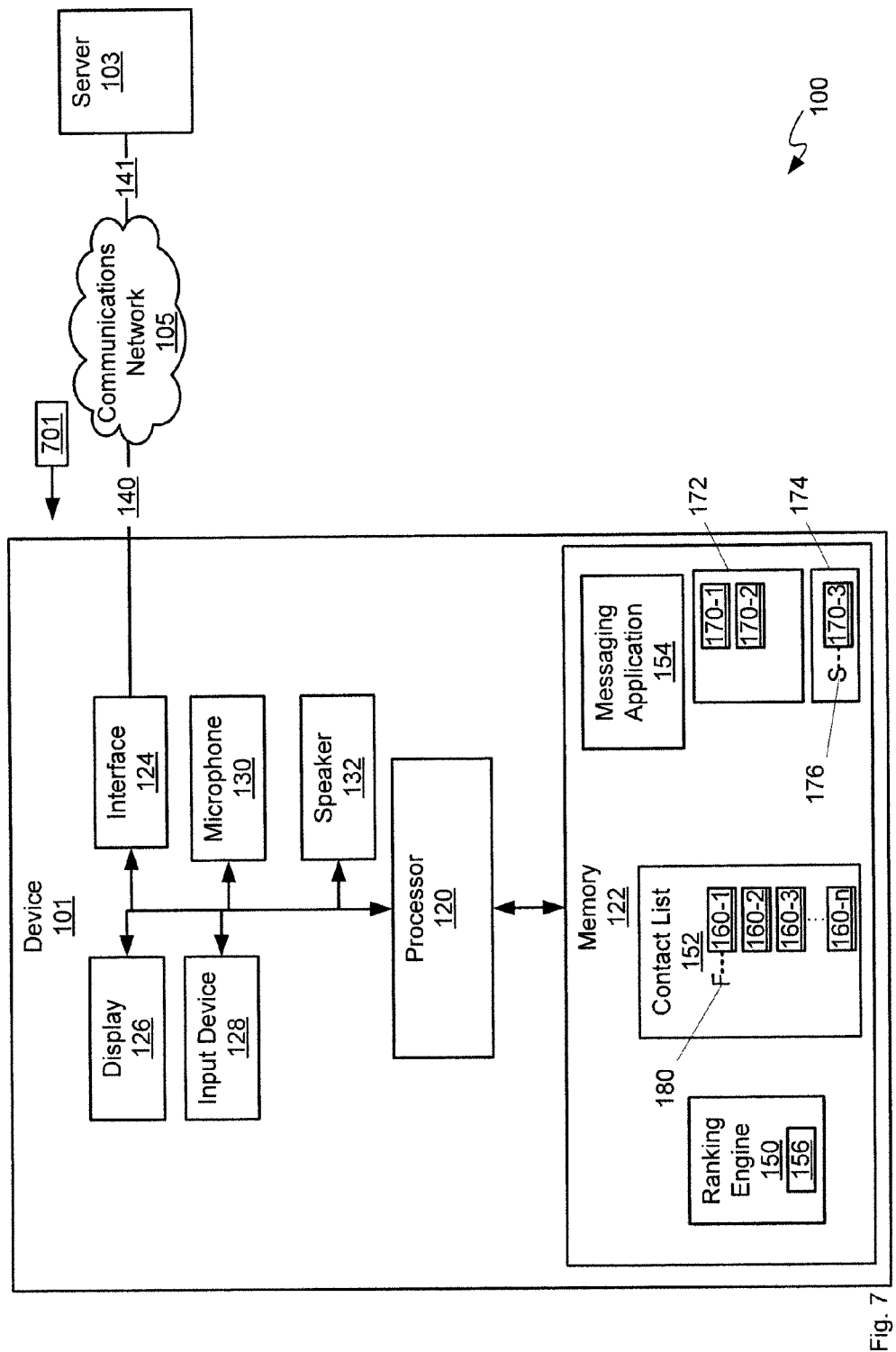
FIG. 7 depicts the system of FIG. 1, after the thread of FIG. 2 is suppressed, and when a message associated with the suppressed thread is received, according to non-limiting implementations.
Figure 8:
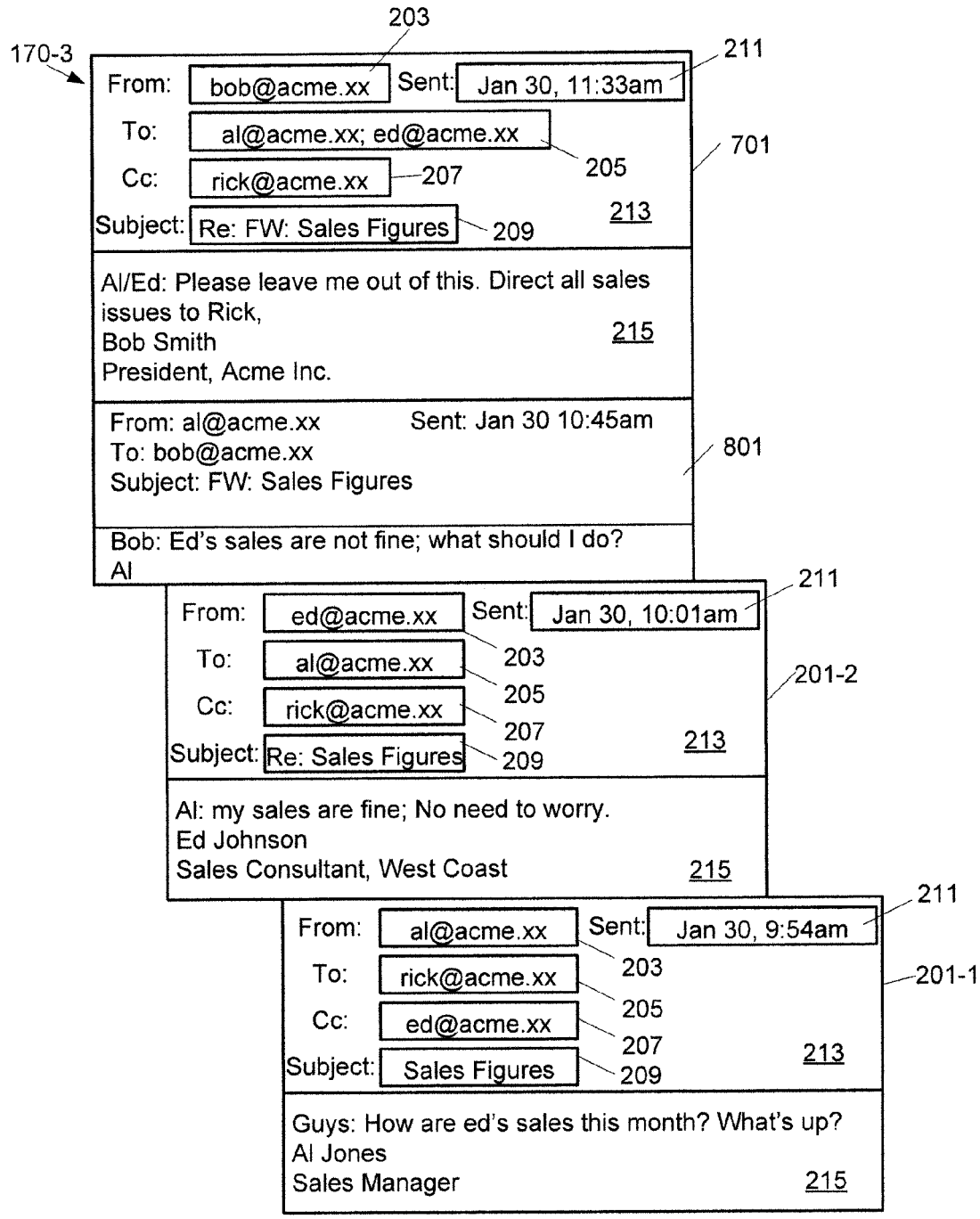
FIG. 8 depicts the thread of FIG. 2 after the message of FIG. 7 has been received, according to non-limiting implementations.

Attention is next directed to FIG. 7 which depicts processor 120, at block 601, receiving a message 701 from server 103 via interface 124, network 105 and links 140, 141. It is further assumed in FIG. 7 that message 701 is associated with suppressed thread 170-3, It is yet further assumed that prior to receiving message 701, processor 120 suppressed thread 170-3, for example in response to input data received at input device 128.

Hence, as depicted in FIG. 8, processor 120 organizes and/or manages thread 170-3 to include message 701, and/or appends message 701 to thread 170-3. For example, processor 120 can determine that message 701 is associated with thread 170-3 by comparing a subject line of message 701 with subject lines of threads 170, and determining that the subject line of message 701 is similar to the subject lines of messages 201 of thread 170-3. However, any header information, metadata and the like can be used to associate message 701 with thread 170-3.

From FIG. 8, it is apparent that message 701 is received from an electronic address ("bob@acme.xx) corresponding to flagged contact 160-1 in contact list 152, and that message 701 has been transmitted to electronic addresses originally in fields 203, 205 and/or 207 of previous messages 201. Indeed, processor 120 can determine that message 170 is associated with contact 160-1 by comparing electronic addresses in fields 203, 205, 207 of message 701 with fields 501-5 to 501-8 of contact 160-1 and/or electronic address fields of other contacts 160.

It is also appreciated that message 701 comprises, in respective text area 215, a message from electronic address corresponding to flagged contact 160-1, and an appended message 801 previously transmitted from electronic address "al@acme.xx" to electronic address "bob@acme.xx" associated with flagged contact 160-1; in other words, a user associated with electronic address "al@acme.xx" forwarded thread 170-3 to a user associated with flagged contact 160-1, and the user associated with flagged contact 160-1 replied, adding electronic addresses "ed@acme.xx" and "rick@acme.xx" to a recipient list in fields 205, 207.

Figure 9:
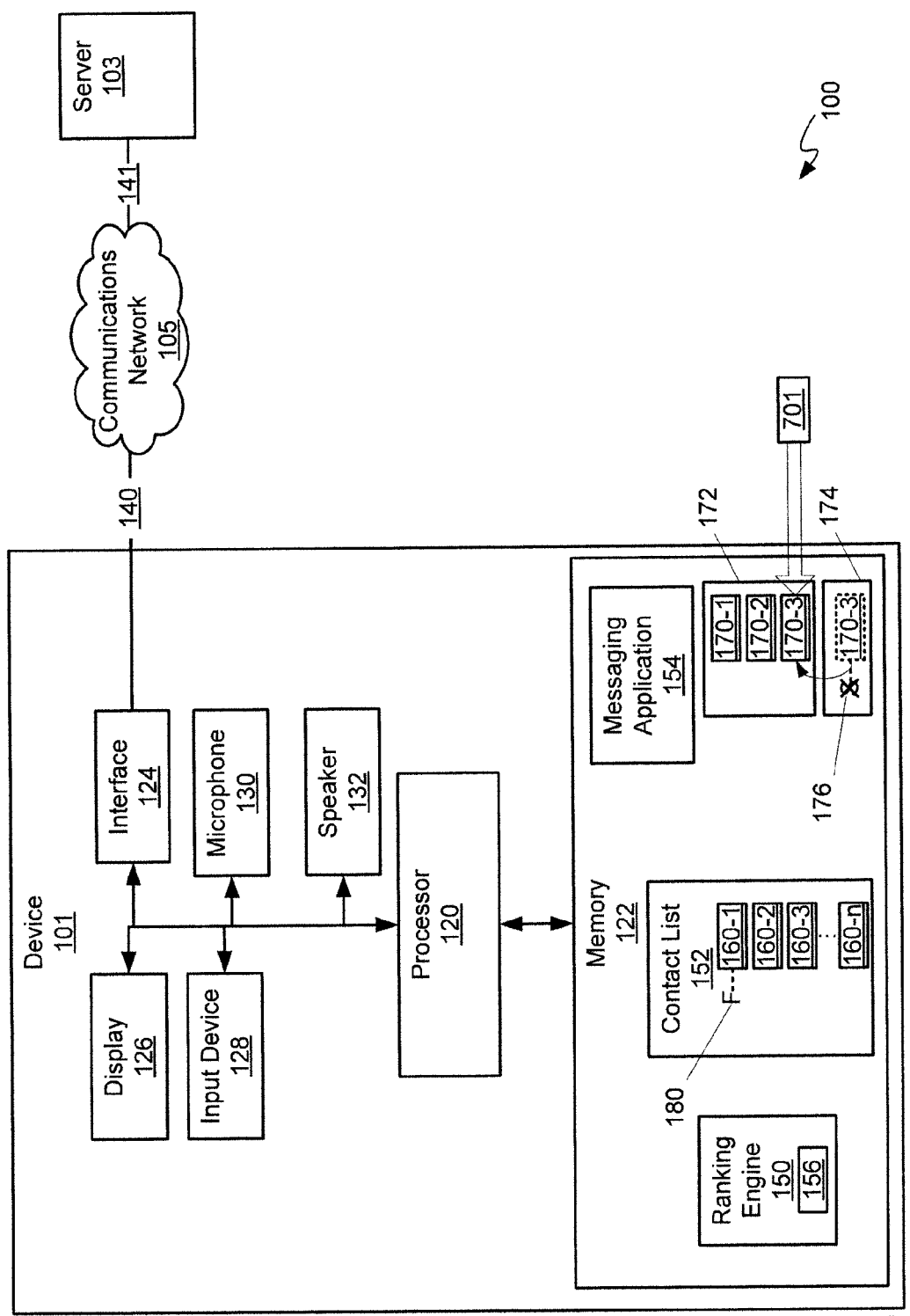
FIG. 9 depicts the system of FIG. 7, when a suppressed thread has been unsuppressed, according to non-limiting implementations.
Figure 10:
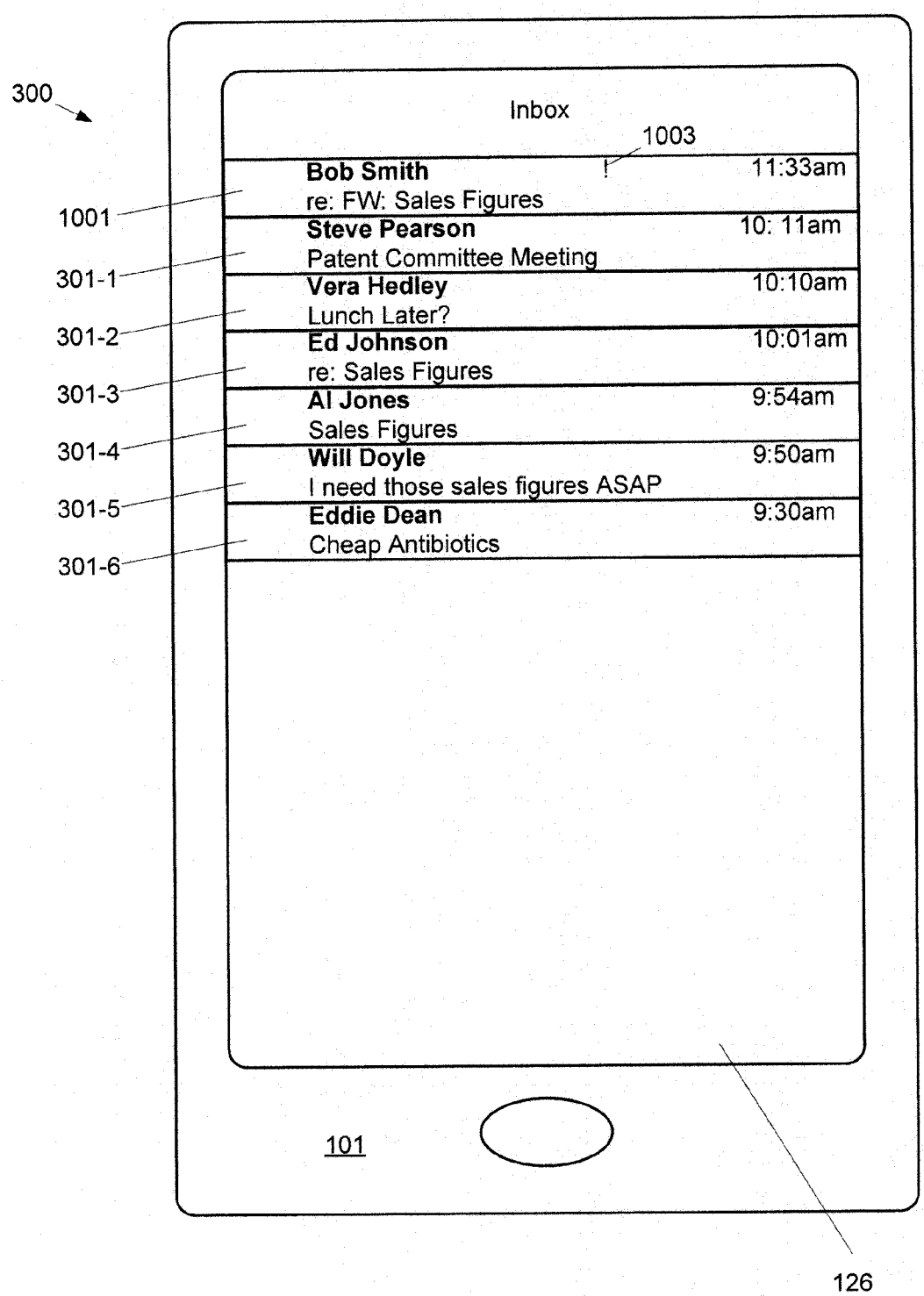
FIG. 10 depicts the inbox of FIG. 3 after a suppressed thread has been unsuppressed, according to non-limiting implementations.

Attention is next directed to FIG. 9, which depicts implementations of block 603; as message 701 is from contact 160-1 that is flagged in contact list 152, processor 120 automatically unsuppress suppressed thread 170-3 by automatically moving suppressed thread 170-3 from second folder 174 to first folder 172. In other words, in these implementations, unsuppressed threads 170 are stored in first folder 172, suppressed thread 170-3 is stored in second folder 174, and processor 120 is further configured to automatically unsuppress suppressed thread 170-3 by automatically moving suppressed thread 170-3 to first folder 172 from second folder 174.

Alternatively, as also depicted in FIG. 9, when suppressed thread 170-3 has been previously flagged as do-not-display, for example via flag 176, such that suppressed thread 170-3 is not displayed at display 126 as in FIG. 4, processor 120 is further configured to automatically unsuppress suppressed thread 170-3 by automatically unflagging suppressed thread 170-3 such that at least message 701 is automatically displayed at display 126. For example, in FIG. 9, processor 120 removes and/or deletes flag 176 from thread 170-3.

From FIGS. 8 and 9, it is further apparent that message 701 has been organized into and/or appended to thread 170-3, which is now unsuppressed.

Attention is now directed to FIG. 10, which depicts inbox 300 after thread 170-3 has been unsuppressed. From FIG. 10, it is apparent that fields 301-3, 301-4, corresponding to messages 201, have been restored to inbox 300, as compared to FIG. 4. Further, inbox 300 comprises an additional field 1001, similar to fields 301, corresponding to message 701. Alternatively, fields 1001, 301-3, 301-4 can be grouped together as a thread at inbox 300. In yet a further alternative, only a latest message 701 in thread 170-3 is displayed, with previous messages 201 accessible upon opening message 701.

In other words, in these implementations, processor 120 is further configured to automatically unsuppress suppressed thread 170-3 by automatically unflagging suppressed thread 170-3 such that at least message 701 is automatically displayed at display 126. Alternatively, processor 120 is further configured to automatically unsuppress suppressed thread 170-3 by automatically unflagging suppressed thread 170-3 such that both message 701 and previous messages 201 in suppressed thread 170-3 are automatically displayed at display 126.

In depicted implementations, message 701 is automatically visually flagged in field 1001, though such visual flagging is appreciated to be optional: for example, field 1001, corresponding to message 701 comprises, an indicator 1003 indicating that message 701 is "important" and/or associated with a contact 160-1 flagged in contact list 152. In these implementations, indicator 1003 comprises an exclamation mark ("!"), however, any indicator and/or mark can be used to indicate that message 701 is associated with a contact 160-1, including, but not limited to a colour of field 1001 and/or text in field 1001, a size of font of text in field 1001 and the like. In any event, the visual flagging serves to highlight message 701 in inbox 300.

Further, when ranking engine 150 ranks contacts 160 according to a scale that is not binary (i.e. more than two ranking levels), message 701 can be automatically visually flagged when displayed at display 126 by providing an indication of ranking level. For example, scale of 1 to 10 can be used: in other words, the exclamation mark can be replaced with a number from 1 to 10.

Figure 11:
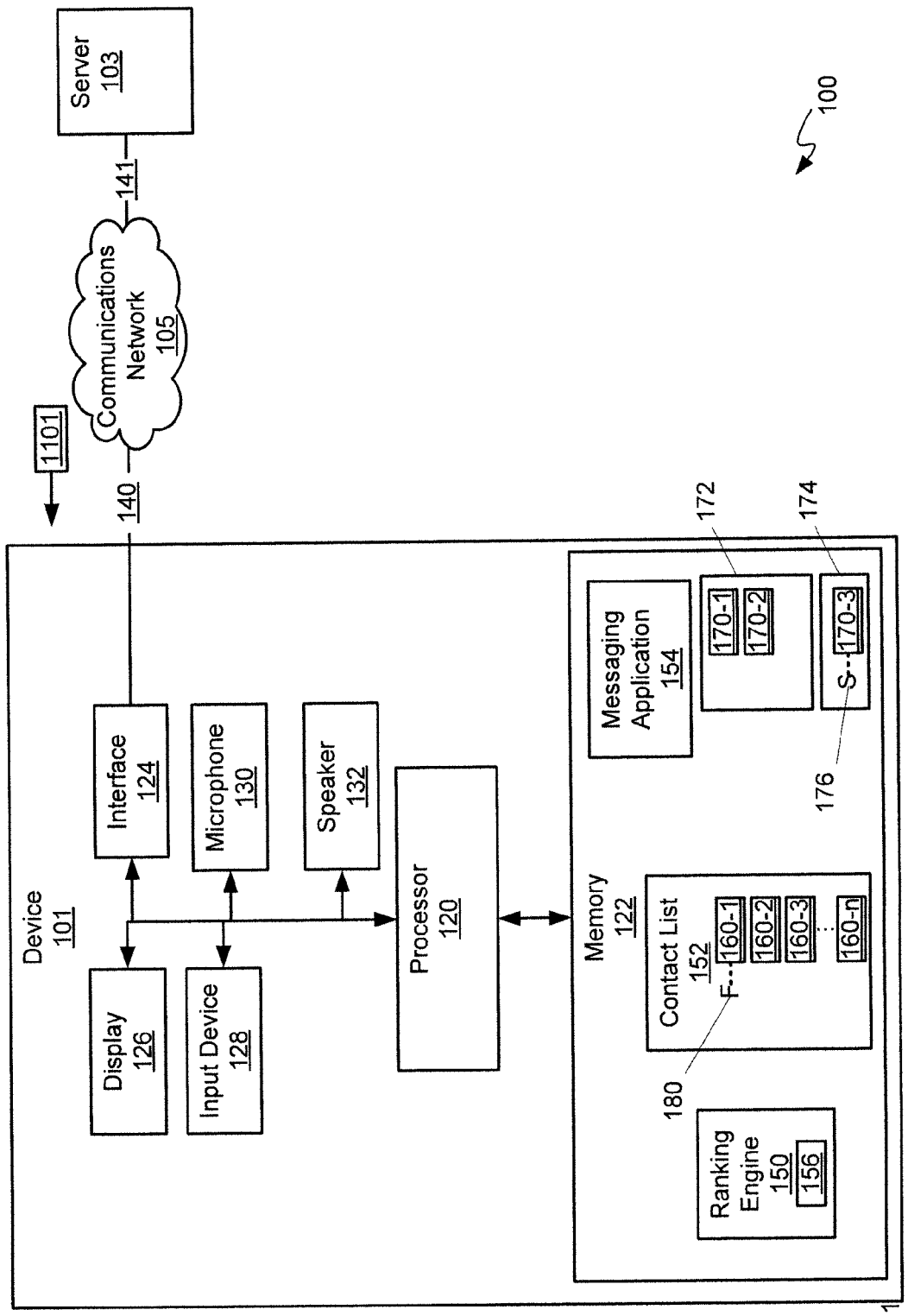
FIG. 11 depicts the system of FIG. 1, after the thread of FIG. 2 is suppressed, and when a message associated with the suppressed thread is received in a scenario different from that of FIG. 7, according to non-limiting implementations.
Figure 12:
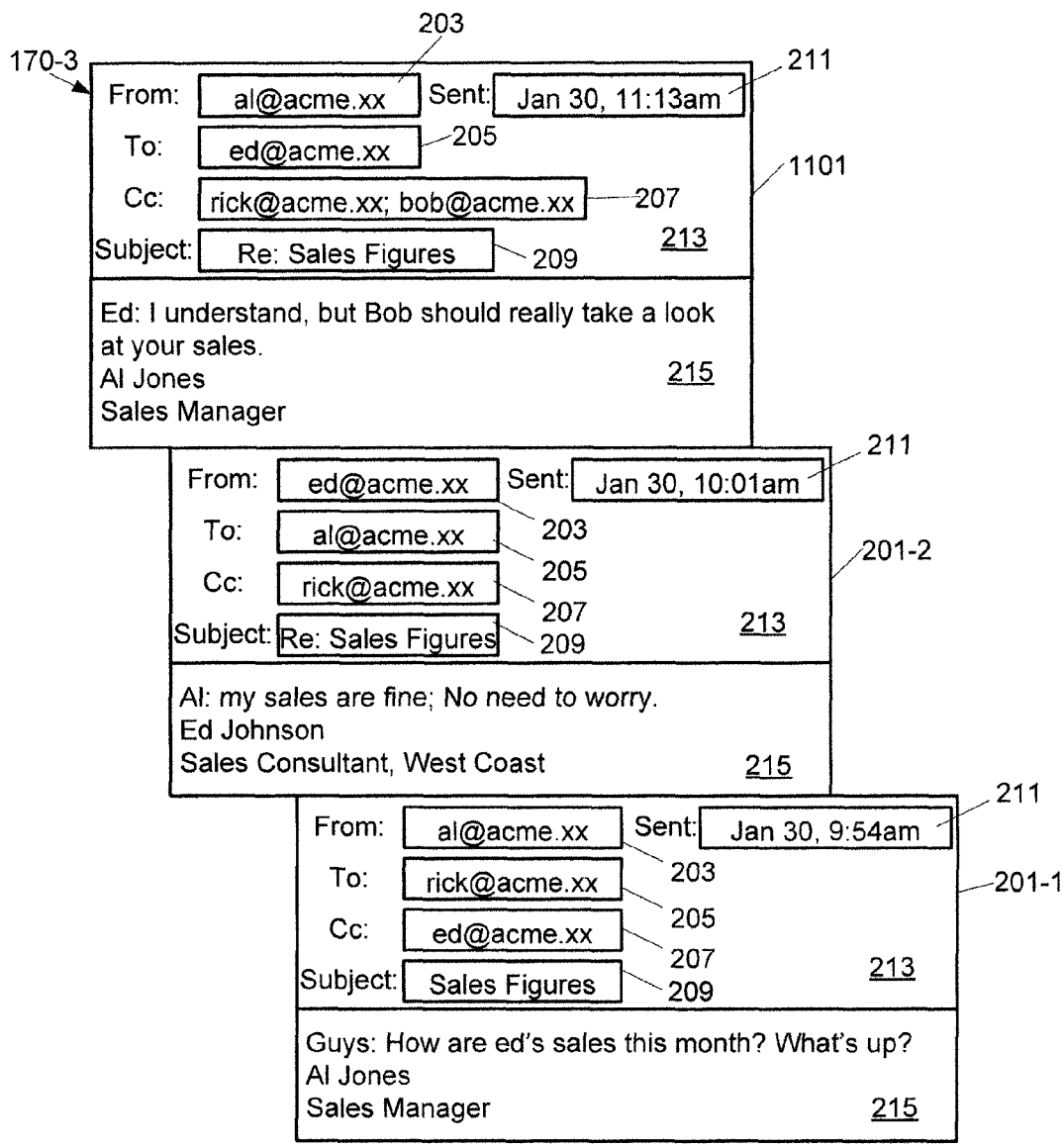
FIG. 12 depicts the thread of FIG. 2 after the message of FIG. 11 has been received, according to non-limiting implementations.

Attention is next directed to FIG. 11, which depicts a different scenario from FIGS. 7 to 10. FIG. 11 depicts system 100 in the same state as in FIG. 1 (i.e. message 701 has not been received and thread 170-3 is suppressed). In these implementations, a message 1101 is received at device 101 from server 103, message 1101 associated with suppressed thread 170-3. However, message 1101 is received, not from an electronic address corresponding to flagged contact 160-1, but from an electronic address that does not correspond to flagged contact 160-1, or any other contact 160 that might be flagged. For example, attention is directed to FIG. 12, which depicts thread 170-3 after message 1101 is received. It is apparent that processor 120 has organized message 1101 as a newly received message in thread 170-3 and/or has grouped message 1101 with messages 201, and the like.

From FIG. 12, it is apparent that message 1101 is received from an electronic address ("al@acme.xx) corresponding to an electronic address that has been previously in one of fields 203 to 207 of messages 201, and that message 1101 has been transmitted to electronic addresses originally in fields 203, 205 and/or 207 of previous messages 201. It is also apparent that an electronic address (i.e. "bob@acme.cc") corresponding to flagged contact 160-1 has been added as a recipient of message 1101 as compared at least to last message 201-2 in suppressed thread 201-2.

Figure 13:
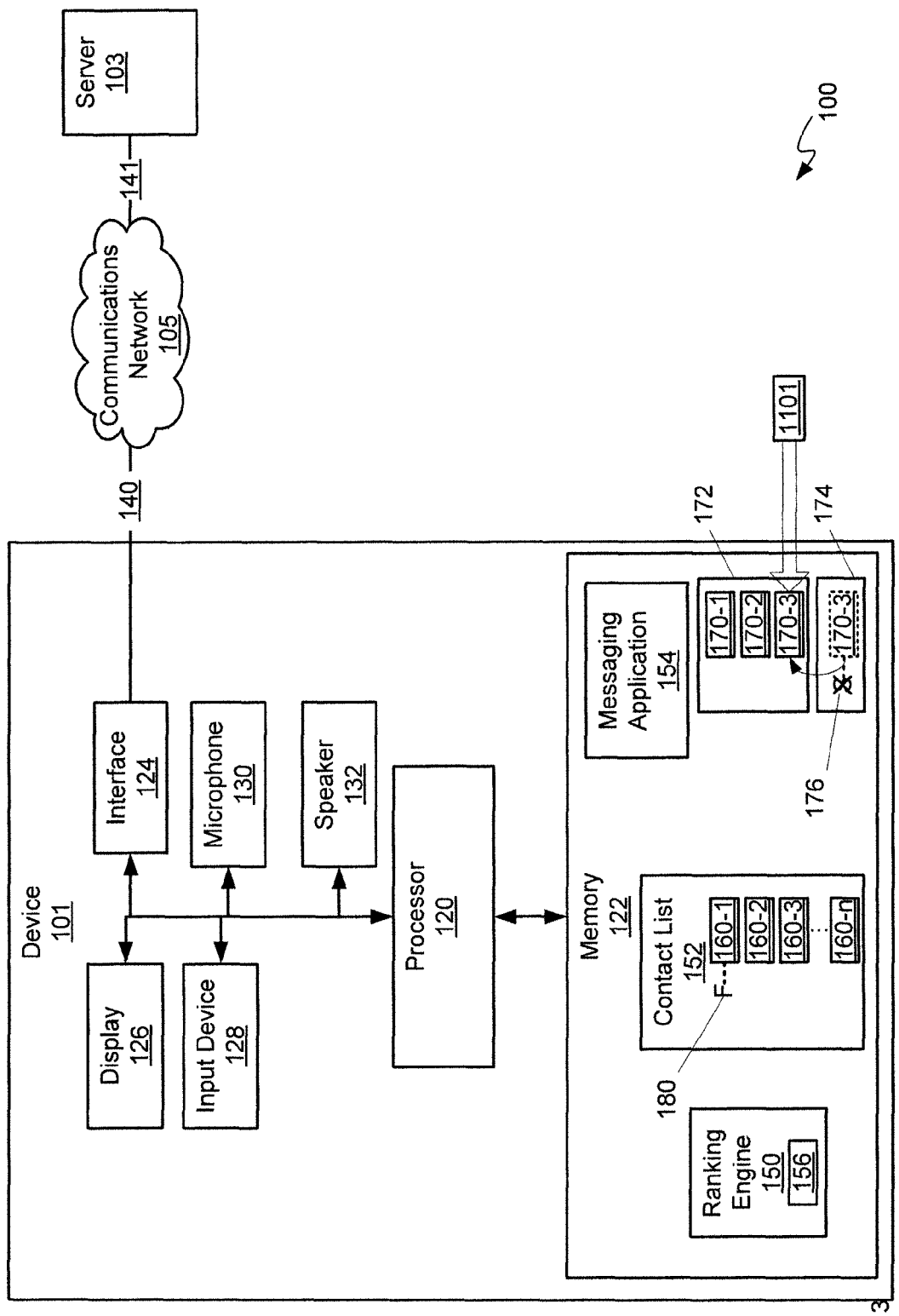
FIG. 13 depicts the system of FIG. 11, when a suppressed thread has been unsuppressed, according to non-limiting implementations.
Figure 14:
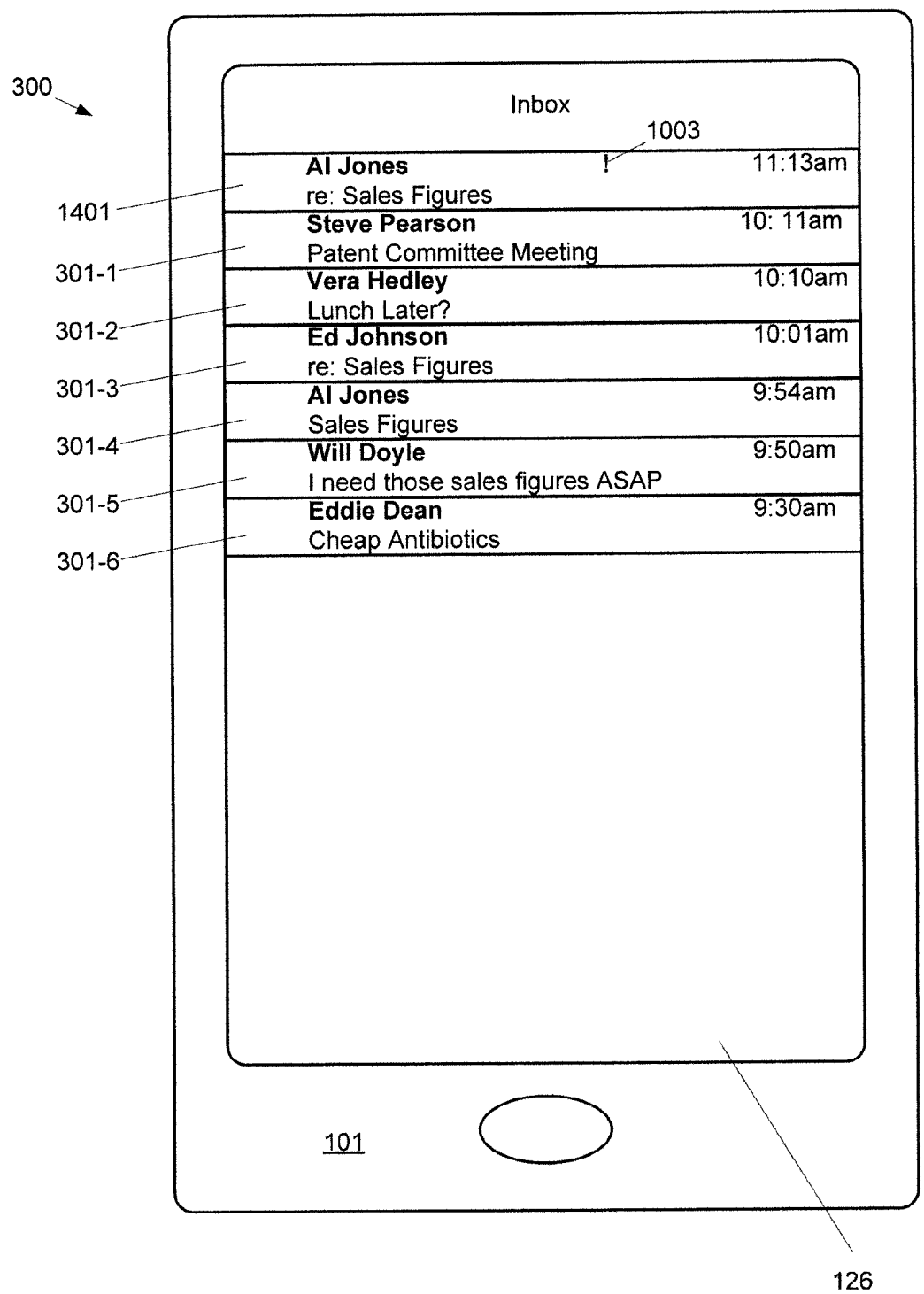
FIG. 14 depicts the inbox of FIG. 3 after a suppressed thread has been unsuppressed, according to non-limiting implementations.

Attention is next directed to FIG. 13, which depicts implementations of block 605 of method 600; contact 160-1 that is flagged in contact list 152 has been added as a recipient of message 1101 as compared to at least a last message 201-2 in suppressed thread 170-3, hence, processor 120 automatically unsuppress suppressed thread 170-3 by automatically moving suppressed thread 170-3 from second folder 174 to first folder 172.

In other words, in these implementations, unsuppressed threads 170 are stored in first folder 172 and suppressed thread 170-3 is stored in second folder 174, and processor 120 is further configured to automatically unsuppress suppressed thread 170-3 by automatically moving suppressed thread 170-3 to first folder 172 from second folder 174.

Alternatively, as also depicted in FIG. 13, when suppressed thread 170-3 has been previously flagged as do-not-display, for example via flag 176, such that suppressed thread 170-3 is not displayed at display 126 (as in FIG. 4), processor 120 is further configured to automatically unsuppress suppressed thread 170-3 by automatically unflagging suppressed thread 170-3 such that at least message 701 is automatically displayed at display 126. For example, in FIG. 13, processor 120 removes and/or deletes flag 176 from thread 170-3.

From FIG. 12, it is further apparent that message 1101 has been organized into thread 170-3, and/or appended to thread 170-3, which is now unsuppressed.

In any event, with reference to FIG. 13, which depicts inbox 300 after thread 170-3 has been unsuppressed, fields 301-3, 301-4, corresponding to messages 201, have been restored to inbox 300, as compared to FIG. 4. Further, inbox 300 comprises an additional field 1401, similar to fields 301, corresponding to message 1101. Alternatively, fields 1401, 301-3, 301-4 can be grouped together as a thread at inbox 300. In yet a further alternative, only a latest message 1101 in thread 170-3 is displayed, with previous messages 201 accessible upon opening message 1101.

In other words, in these implementations, processor 120 is further configured to automatically unsuppress suppressed thread 170-3 by automatically unflagging suppressed thread 170-3 such that at least message 1101 is automatically displayed at display 126. Alternatively, processor 120 is further configured to automatically unsuppress suppressed thread 170-3 by automatically unflagging suppressed thread 170-3 such that both message 1101 and previous messages 201 in suppressed thread 170-3 are automatically displayed at display 126.

It is appreciated however, that if flagged contact 160-1 had been a recipient of previous messages 201, then thread 170-3 would not be unsuppressed, unless a new message in thread 170-3 is from contact 1601, for example message 701.

It should now be apparent that, in these implementations, ranking engine 150 and messaging application 154 interact via contact list 152. For example, ranking engine 152 ranks contacts 160 in contact list 152 by flagging contacts 160 as important based on ranking criteria 156. In turn, messaging application 154 determines that a contact 160 from whom a message is received is flagged by analyzing contact list 152. Hence, contact list 152 is configured as a database accessible by both ranking engine 150, which writes data to contact list 152 by ranking and/or flagging contacts 160, and messaging application 154, which reads data from contact list 152 to determine which contacts 160 have been flagged.

Persons skilled in the art will appreciate that there are yet more alternative implementations and modifications possible.

For example, in implementations where ranking engine 150 ranks contacts 160 according to a scale that is not binary (i.e. more than two ranking levels), messages from contacts 160 that are ranked above a threshold ranking level cause an associated thread 170 to be unsuppressed. In other words, in these implementations, processor 120 is configured to automatically unsuppress suppressed thread 170-3 when one or more of: a message associated with suppressed thread 170-3 is from a contact 160 that is above a threshold ranking level in contact list 152; and, the contact 160 that above the threshold ranking level in contact list 152 has been added as a recipient of the message as compared to at least a last message in suppressed thread 170-3. The threshold ranking level can be configured at device 101, for example via receipt of input data at input device 128.

In yet further implementations, for example in a client-server environment, one or more of ranking application 150, contact list 152 and messaging application 154 can be located at server 103, and at least a portion of method 600 can be implemented at server 130. For example, suppressed threads 170 can be stored at server 103, and unsuppressed threads 170 can be stored at device 101; when a new message is received at server 103 for transmission to device 101, server 103 can determine whether the message is from a contact that is flagged in contact list 152 and/or whether the contact that is flagged in the contact list has been added as a recipient of the message as compared to at least a last message in the suppressed thread. If contact list 152 and/or ranking engine 150 is at device 101, than server 103 can make such a determination by querying device 101.

In any event, implementation of method 600 can ensure that suppressed threads are automatically unsuppressed when a new message in the suppressed thread is from a flagged contact and/or the flagged contact is has been added to a recipient list. Hence, suppressed threads associated with flagged contacts, who may alternatively be designated as important contacts (e.g. spouses, family members, managers, CEOs (chief executive officers) and the like) are automatically unsuppressed provided at device 101. In addition, as suppressed threads are unsuppressed, notifications of new messages associated with unsuppressed threads can be provided.

Those skilled in the art will appreciate that in some implementations, the functionality of device 101 and server 103 can be implemented using pre-programmed hardware or firmware elements (e.g., application specific integrated circuits (ASICs), electrically erasable programmable read-only memories (EEPROMs), etc.), or other related components. In other implementations, the functionality of device 101 and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive), Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a processor, a display device, a memory storing a messaging application and a ranking engine, and a communication interface, the processor configured to:
provide, at the display device, a thread of messages at an inbox of the messaging application;
after providing, at the display device, the thread of messages, generate a suppressed thread of messages from the thread of messages by: removing the thread of messages from the inbox at the display device such that none of the messages in the thread of messages are provided at the inbox at the display device, while simultaneously storing the suppressed thread in the memory;
process the ranking engine to: rank contacts in a contact list with a ranking level in a non-binary ranking scale based on ranking criteria;
receive, using the communication interface, a new message associated with the suppressed thread; and,
automatically unsuppress the suppressed thread when one or more of:
the new message is from a contact in the contact list and the ranking level of the contact is greater than a threshold ranking level; and,
the contact that has the ranking level that is greater than the threshold ranking level has been added as a recipient of the new message as compared to at least a last message in the suppressed thread,
wherein to automatically unsuppress the suppressed thread, all the messages in the thread, including previous messages and the new message, are again provided at the inbox of the messaging application at the display device, the previous messages being automatically restored at the inbox.

2. The device of claim 1, wherein the processor is further configured to process the ranking engine to flag contacts in the contact list when the contacts meet ranking criteria.

3. The device of claim 2, wherein the ranking criteria is based on one or more of an organizational chart, previous threads, and a time between receiving a message from a given contact and transmission of a responding message.

4. The device of claim 1, wherein unsuppressed threads are stored in a first folder and the suppressed thread is stored in a second folder, the processor is further configured to automatically unsuppress the suppressed thread by automatically moving the suppressed thread to the first folder from the second folder.

5. The device of claim 4, wherein the first folder is stored at the memory and the second folder is stored at the memory.

6. The device of claim 1, wherein the new message is automatically visually flagged when provided at the display device after unsuppressing the suppressed thread, the previous messages being visually unflagged as compared to the new message.

7. The device of claim 1, further comprising an input device, and wherein the processor is further configured to, prior to receiving the new message, generate the suppressed thread in response to input data received at the input device.

8. The device of claim 1, wherein the ranking engine ranks contacts in the contact list by flagging the contacts as important based on ranking criteria, and the messaging application determines that the contact from whom the new message is received is flagged by analyzing the contact list.

9. A method comprising:
at device comprising: a processor, a display device, a memory storing a messaging application and a ranking engine, and a communication interface, providing, at the display device, a thread of messages at an inbox of the messaging application;
after providing, at the display device, the thread of messages, generate, at the processor, a suppressed thread of messages from the thread of messages by: removing the thread of messages from the inbox at the display device such that none of the messages in the thread of messages are provided at the inbox at the display device, while simultaneously storing the suppressed thread in the memory processing, at the processor, the ranking engine to: rank contacts in a contact list with a ranking level in a non-binary ranking scale based on ranking criteria;

receiving, using the communication interface of device, a new message associated with the suppressed thread; and, automatically unsupressing the suppressed thread, using the processor, when one or more of:

the new message is from a contact in the contact list and the ranking level of the contact is greater than a threshold ranking level; and, the contact that has the ranking level that is greater than the threshold ranking level has been added as a recipient of the new message as compared to at least a last message in the suppressed thread, wherein to automatically unsuppress the suppressed thread, all the messages in the thread, including previous messages and the new message, are again provided at the inbox of the messaging application at the display device, the previous messages being automatically restored at the inbox.

10. The method of claim 9, further comprising processing, at the processor, the ranking engine to flag contacts in the contact list when the contacts meet ranking criteria.

11. The method of claim 10, wherein the ranking criteria is based on one or more of an organizational chart, previous threads, and a time between receiving a message from a given contact and transmission of a responding message.

12. The method of claim 9, wherein unsuppressed threads are stored in a first folder and the suppressed thread is stored in a second folder, the method further comprising automatically unsuppressing the suppressed thread by automatically moving the suppressed thread to the first folder from the second folder.

13. The method of claim 1, wherein the new message is automatically visually flagged when provided at the display device after unsuppressing the suppressed thread, the previous messages being visually unflagged as compared to the new message.

14. The method of claim 9, further comprising, prior to receiving the new message, suppressing the suppressed thread in response to input data received at an input device of the device.

15. The method of claim 9, further comprising: ranking, using the ranking engine, contacts in the contact list by flagging the contacts as important based on ranking criteria; and, determining, at the messaging application, that the contact from whom the new message is received is flagged by analyzing the contact list.

16. A non-transitory computer-readable medium storing a computer program, wherein execution of the computer program is for:

at device comprising: a processor, a display device, a memory storing a messaging application and a ranking engine, and a communication interface, providing, at the display device, a thread of messages at an inbox of the messaging application;

after providing, at the display device, the thread of messages, generate, at the processor, a suppressed thread of messages from the thread of messages by: removing the thread of messages from the inbox at the display device such that none of the messages in the thread of messages are provided at the inbox at the display device, while simultaneously storing the suppressed thread in the memory processing, at the processor, the ranking engine to: rank contacts in a contact list with a ranking level in a non-binary ranking scale based on ranking criteria;

receiving, using the communication interface of device, a new message associated with the suppressed thread; and, automatically unsupressing the suppressed thread, using the processor, when one or more of:

the new message is from a contact in the contact list and the ranking level of the contact is greater than a threshold ranking level; and, the contact that has the ranking level that is greater than the threshold ranking level has been added as a recipient of the new message as compared to at least a last message in the suppressed thread, wherein to automatically unsuppress the suppressed thread, all the messages in the thread, including previous messages and the new message, are again provided at the inbox of the messaging application at the display device, the previous messages being automatically restored at the inbox.

* * * * *